United States Patent [19]
Fuller

[11] 4,363,002
[45] Dec. 7, 1982

[54] CLOCK RECOVERY APPARATUS FOR PHASE SHIFT KEYED ENCODED DATA

[76] Inventor: Robert M. Fuller, 28925 - 211th SE., Kent, Wash. 98031

[21] Appl. No.: 206,443

[22] Filed: Nov. 13, 1980

[51] Int. Cl.³ .......................................... H04L 27/22
[52] U.S. Cl. ................................... 331/1 A; 328/155; 331/23; 331/25; 375/87; 375/120
[58] Field of Search ...................... 331/1 A, 18, 23, 25; 329/50; 328/155; 375/83–87, 94, 108, 110, 119, 120

[56] References Cited

U.S. PATENT DOCUMENTS

| | | | |
|---|---|---|---|
| 4,010,323 | 3/1977 | Peck | 375/119 X |
| 4,167,760 | 9/1979 | Decker | 375/87 X |
| 4,234,957 | 11/1980 | Tracey et al. | 375/86 |

Primary Examiner—Siegfried H. Grimm

[57] ABSTRACT

A pseudo clock generator produces pulses synchronous with, and having a period equal to one-half of the clock signal within a phase shift keyed encoded data stream. A phase lock circuit, having a stable period equal to that of the data clock signal tends to lock to the pseudo clock signal. Logic detects the condition of the phase lock signal being in phase lock with said data clock signal and in response thereto, masking circuitry prevents the pseudo clock generator from responding to input data transitions which occur outside of a predetermined masking window.

10 Claims, 4 Drawing Figures

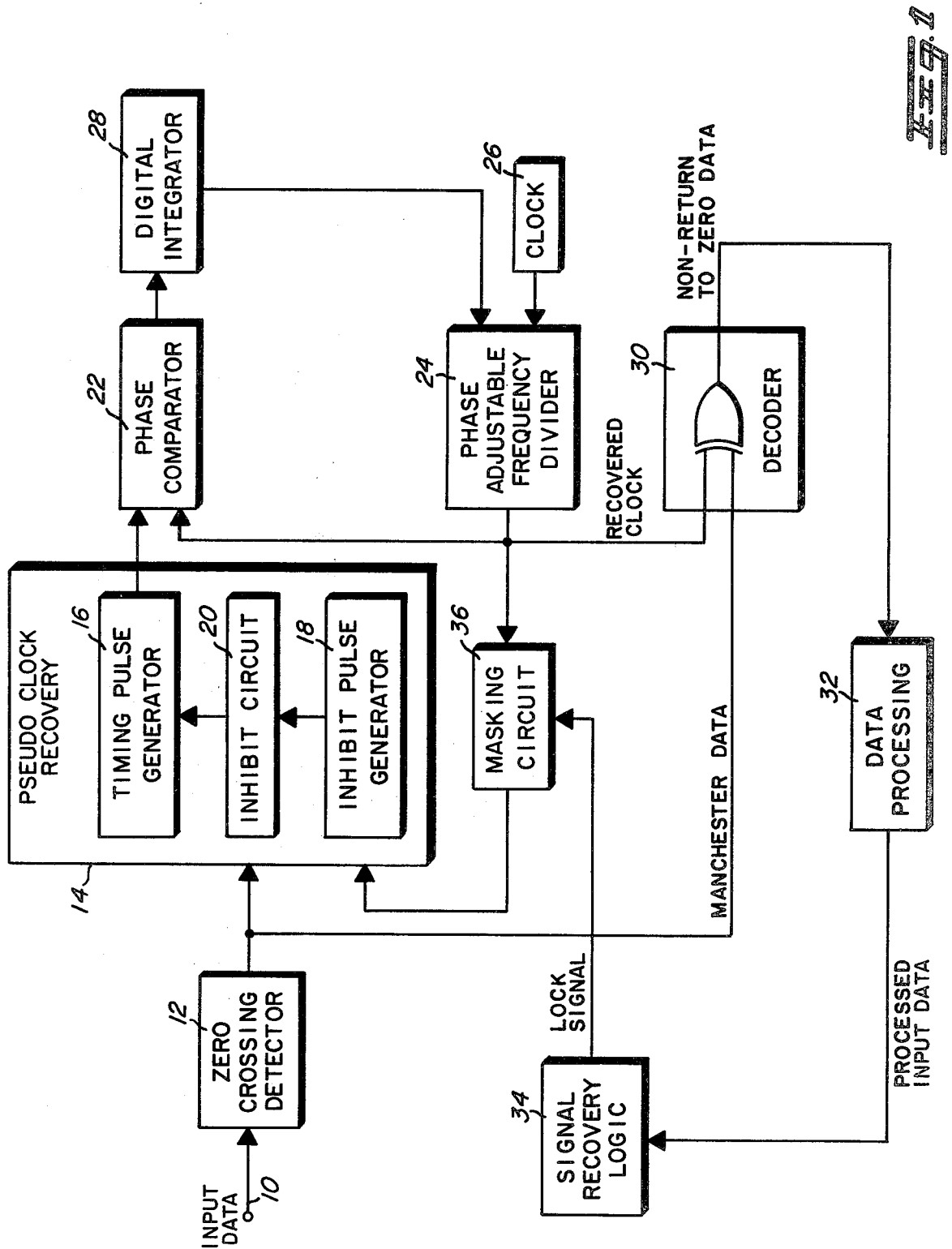

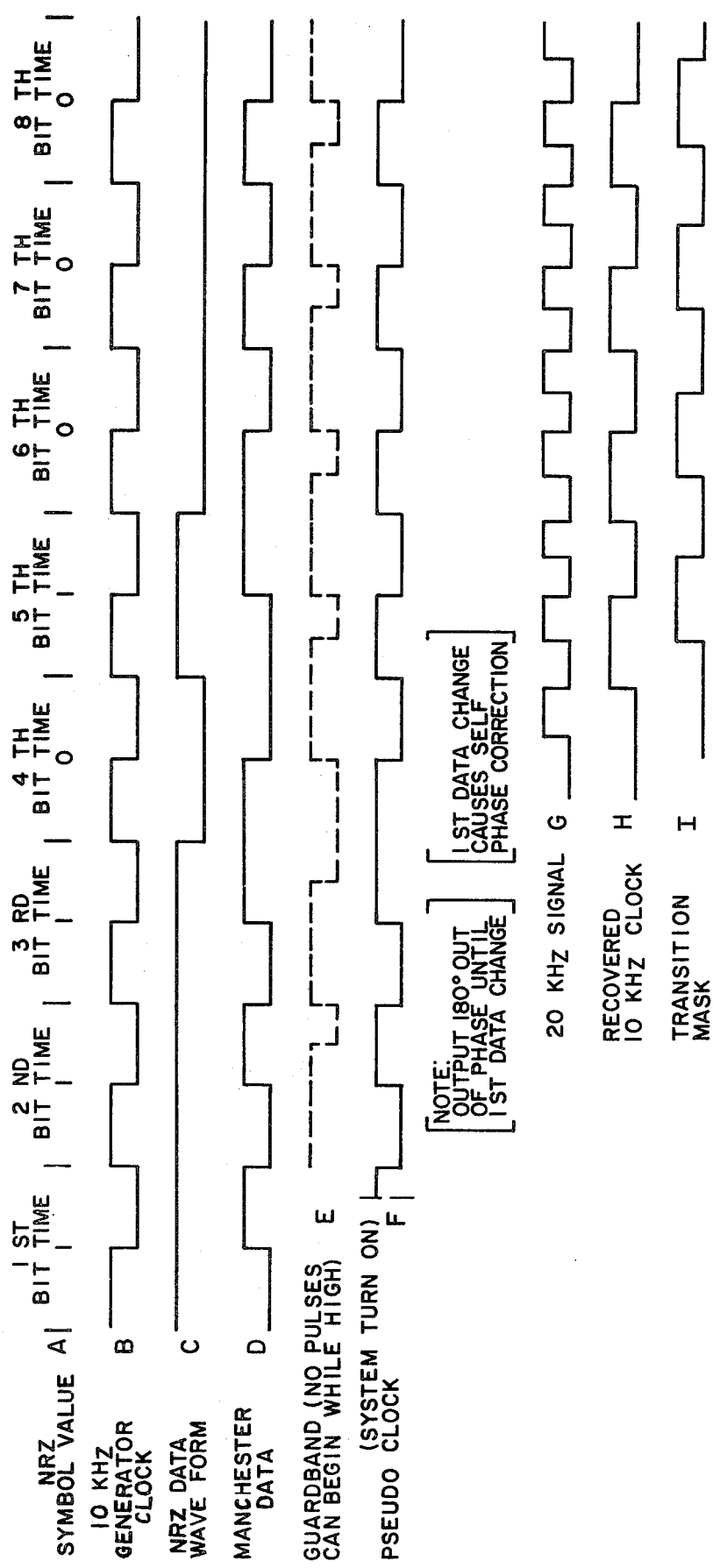

CLOCK RECOVERY APPARATUS FOR PHASE SHIFT KEYED ENCODED DATA

BACKGROUND OF THE INVENTION

The present invention pertains to the electrical communication art and, more particularly to apparatus for recovering the clock signal in a phase shift keyed encoded data signal.

In numerous digital communication systems, the information data is processed with a stable clock frequency signal prior to data transmission. An example of such a system is found in the mobile telephone communication art. There, addressing or "paging" data signals at a base station originate in non-return-to-zero form. Such signals are not suited for transmission over communication channels. As such, they are commonly combined with a stable frequency clock signal to produce a phase shift keyed transmission signal. In fact, the common form of such transmission signals is Manchester encoded data.

For the system to operate properly, data transmissions from the base station must be received, and processed at the mobile station with efficiency and precision. To accurately reproduce the original non-return-to-zero information from the received Manchester signal, apparatus must be provided for the recovery of the clock signal. It is imperative that a means be provided to identify the correct clock phase and then to prevent the mobile station from locking on to the opposite phase during noise and periods of no channel conditions which occur due to multipath fading and other obstructions.

In one prior art approach to extracting the clock from Manchester encoded input data signals, the input signal is full wave rectified and then bandpassed, at the clock frequency, to recover bit clock information. The bit clock information drives a phase locked loop having a voltage controlled oscillator, the output from which is used as the recovery clock signal.

This prior art system exhibits numerous shortcomings. For example, to avoid spurious responses closely matched and, thus, expensive rectifier diodes must be used. Further, the system is subject to clock recovery drift as a function of the number of transitions in the input data. That is, as the input data tends to approach logic one or logic zero symbols, this prior system exhibits a clock drift which leads to recovery errors.

Thus, there has been a long felt need in the data communication art for a precision, high speed clock recovery system.

SUMMARY OF THE INVENTION

It is an object of this invention, therefore, to provide apparatus for the precise, high speed recovery of a clock signal within an input data bit stream.

It is a particular object of the invention to provide the above described precise, high speed clock recovery apparatus which is suited for recovering the clock in a Manchester encoded data signal.

Briefly, according to the invention, apparatus is provided for recovering the clock signal, of predetermined period T, within a predetermined phase shift keyed encoded input data signal. The apparatus includes a pseudo clock signal means which produces a pseudo clock signal having a period T and having transitions corresponding to the input data signal. Phase lock means includes an oscillator for producing a phase variable signal having said predetermined period T and a phase comparator for comparing the phase of the oscillator produced signal with the phase of the pseudo clock signal and, in response thereto, causing the phase of the oscillator produced signal to tend to lock with the pseudo clock signal. Signal recovery logic produces a lock signal responsive to the oscillator produced signal being in phase lock with the clock signal of the encoded input data signal. Masking circuitry is responsive to a produced locked signal for producing a matching signal having a predetermined time duration t, where $t \leq T/4$. Each $t/2$ of the masking signal is on either side of the transitions of the pseudo clock signal. Masking circuitry prevents the pseudo clock signal from responding to input data signal transitions which occur outside of the masking signal duration. Thus, the oscillator means produced signal comprises the recovered clock signal.

Preferably, the pseudo clock signal means includes timing pulse means for producing, synchronous to the occurrence of an input data transition, a timing pulse having a period $T/2$. An inhibit pulse means produces, synchronous to the occurrence of an input data transition, an inhibit pulse having a predetermined period $T_I$, where $T/2 < T_I < T$. Inhibit means inhibits the production of a timing pulse during the period $T_I$ of an inhibit pulse. Hence, the timing pulse is comprised of the pseudo clock signal.

BRIEF DESCRIPTION OF THE DRAWINGS

FIG. 1 is a block diagram illustrating the preferred embodiment of the clock recovery apparatus;

FIG. 3 is a timing diagram illustrating operation of the system shown in FIGS. 1 and 2A, 2B.

DETAILED DESCRIPTION OF THE PREFERRED EMBODIMENT OF THE INVENTION

Figure 2A:
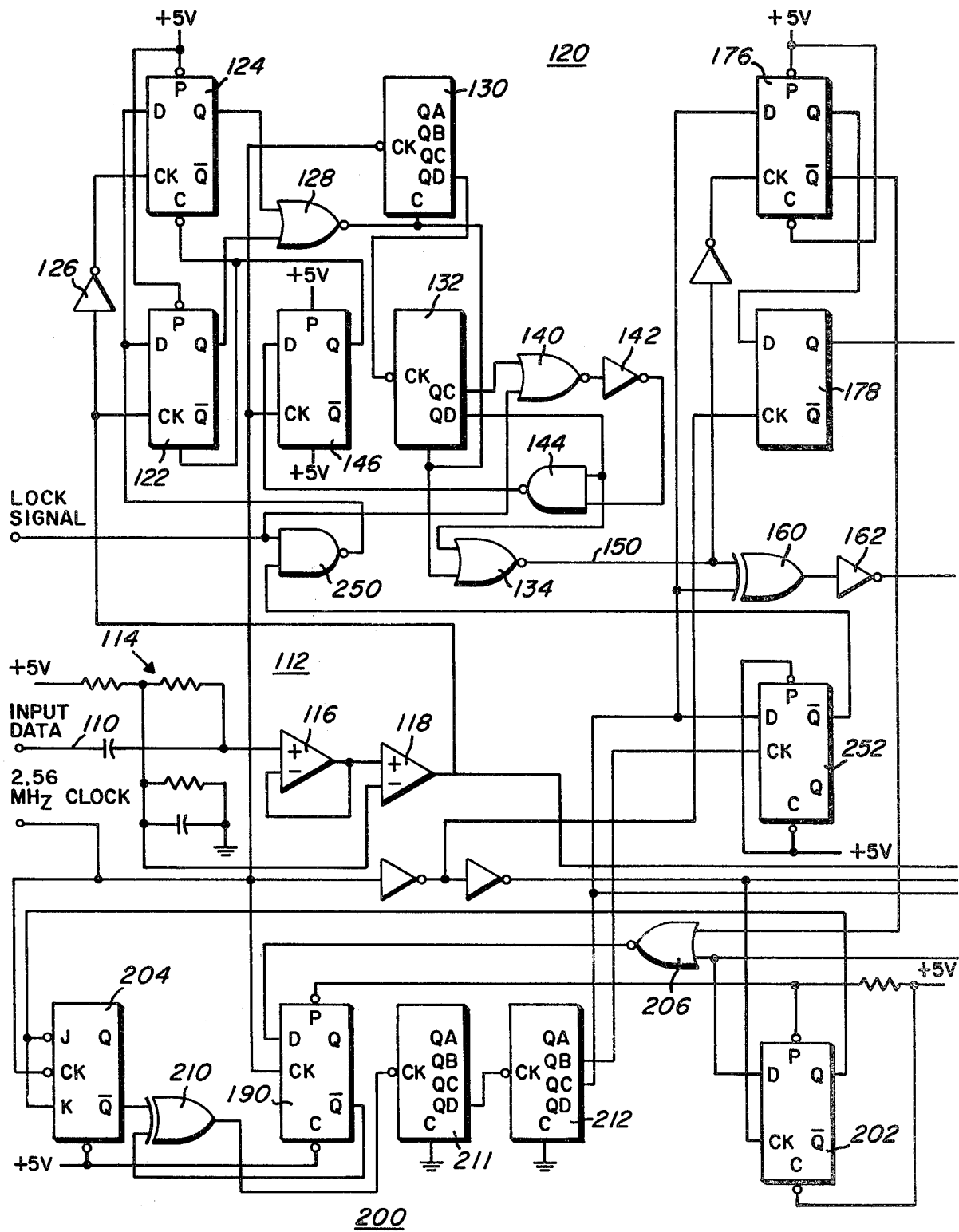
FIGS. 2A and 2B are detailed schematic diagrams of the system shown in FIG. 1.

FIG. 1 is a block diagram of the preferred embodiment of the clock recovery apparatus according to the invention.

Here, input data is routed on a line 10 to a zero crossing detector 12. In general, the input data might comprise any phase shift keyed digital information and, in this, the preferred embodiment of the invention, the input data is Manchester encoded data. Such Manchester encoded data may be found, for example, in the mobile communication art wherein a base station addresses mobile stations via a Manchester encoded bit stream. At the base station site, non-return-zero (NRZ) addressing is combined with a fixed frequency (e.g. 10 kilohertz) clock signal to produce the Manchester encoded data.

This is more clearly illustrated in FIG. 3 wherein line A represents the NRZ address for a particular mobile station. Line B corresponds to the fixed 10 kilohertz clock. The NRZ data waveform corresponding to the NRZ coded values is shown in line C. Here, it is seen that a logic "1" in the address corresponds to a high signal level and a logic "0" to a low signal level, and, further that a sequence of 1's or 0's does not result in a signal level transition.

Line D of FIG. 3 illustrates the Manchester encoded form of the NRZ address. Thus, a transition from a low to a high level, synchronous to the occurrence of a clock transition and in the middle of an NRZ bit time corresponds to a logic 1 level whereas a transition from a high to a low level, synchronous to the clock and in the middle of NRZ bit time corresponds to a logic 0 level. For the reasons discussed herein above, it is preferable to use Manchester encoded data over a transmission medium than NRZ data.

Referring again to FIG. 1, the input data, which may be supplied from a conventonal radio receiver (not shown) is passed over line 10 to a zero crossing detector 12. Zero crossing detector 12 may be comprised of a high gain, limiting amplifier and is used to "clean up" low level noise on the input data signal.

The output of zero crossing detector 12 is passed to the pseudo clock recovery block 14. Pseudo clock recovery block 14 includes a timing pulse generator 16, an inhibit pulse generator 18 and an inhibit circuit 20. The timing pulse generator 16 responds to an input data signal transition by producing a pulse having a period equal to one half the period of the clock signal used to encode the Manchester data. Thus, for the present example wherein the encoding clock has a frequency of 10 kilohertz (and, thus, a period T=100 microseconds) the period of the timing pulse generator is T/2 or 50 microseconds.

The inhibit pulse generator 18 also responds to a transition of the input data to produce an inhibit pulse. The duration of the inhibit pulse is a selected value between T/2 and T. Preferably, for the present application, the inhibit pulse has a duration 3T/4.

In response to the occurrence of an inhibit pulse from generator 18, the inhibit circuit 20 prevents the timing pulse generator from responding to input data transitions during the full period of an inhibit pulse.

Operation of the pseudo clock recovery circuit may be better understood with reference to FIG. 3. Here, line F represents the output from the timing pulse generator 16 and line E the output from inhibit pulse generator 18. Thus, assuming that the pseudo clock recovery apparatus is turned on at the point indicated, the timing pulse generator will produce its 50 microsecond pulse upon the first input data transition. This also initiates a 75 microsecond inhibit pulse from the inhibit generator. Note that at this point the pseudo clock generator is exactly 180 degrees out of phase with the encoding clock signal. Due to the action of the inhibit pulse, the timing pulse generator will be inhibited from responding to the next input data transition since it occurs within the 75 microsecond period of the inhibit pulse. This process repeats itself, as shown, until such time that a data change causes self phase correction. From this point forward, due to the action of the timing pulse generator and inhibit circuitry, the pseudo clock signal will remain in phase with the encoding clock signal, assuming a clean input data signal.

Referring again to FIG. 1, the pseudo clock signal out of pseudo clock recovery block 14 is passed to one of two inputs of a phase comparator 22. The remaining input of phase comparator 22 is supplied from a phase adjustable frequency divider 24. The phase adjustable frequency divider 24 divides signals of fixed frequency, provided by a standard clock 26, by an adjustable divisor. This adjustable divisor is determined by the output from a digital integrator 28. This system operates in a manner similar to a conventional analog phase locked loop in that an output from the phase comparator 22, indicative of a phase difference between the signals at its input, is integrated through block 28 and is applied as an error signal to the control input of the phase adjustable frequency divider 24. In response to this control signal, the phase adjustable frequency divider varies its divisor and the loop operates to cause the output from the phase adjustable frequency divider 24 to be in phase with the output from the pseudo clock recovery apparatus 14.

Since the pseudo clock recovery apparatus 14 locks to the encoded data clock signal and since the output from the phase adjustable frequency divider 24 is locked to the pseudo clock recovery produced signal, the output from the phase adjustable frequency divider 24 may be combined with the Manchester data in a Manchester to non-return-to-zero decoder 30. In practice, the decoder 30 may be comprised of a standard exclusive OR gate. In this way, the output from decoder 30 is the recovered NRZ data.

The recovered NRZ data is further processed by the data processing block 32 which, in the well known manner, decodes and operates in response to the information in the NRZ data.

The processed input data is passed to a signal recovery logic block 34. Logic block 34 includes circuitry for determining whether or not the input data on line 10 is being successfully decoded, i.e., whether the clock recovery is, in fact, in sync with the decoding clock signal. Thus, for example, a standard data bit sequence known as a Barker code may be transmitted by the base station to a mobile unit. The signal recovery logic 34 is designed to detect reception of this Barker code and if it does appear, the signal recovery logic indicates that the clock signal is being properly recovered by producing a lock signal at its output.

A lock signal from the signal recovery logic 34 is passed to a masking circuit 36. Masking circuit 36 provides a "flywheel" mode to the system. That is, the pseudo clock recovery block 14 is subject to falling out of phase if a noise pulse on the input data occurs within ±90 degrees during a period of data consisting of all logic 1's or 0's. The out of phase condition of the pseudo clock recovery unit will persist until a data transition occurs or until another noise burst generates a zero crossing in the proper time frame to correct the system to zero phase. Although the likelihood of prolonged data streams containing no data changes is small, they do occur and are sufficiently long to pull the output of the phase adjustable frequency divider 24 off of zero phase causing bit error rate enhancement. If the condition persists, the system will lose lock completely, resulting in high recovery errors until lock is reacquired.

To circumvent this problem, the flywheel mode is initiated once the signal recovery logic 34 determines that the system is in lock. In this mode, a lock signal from the recovery logic 34 activates the masking circuit 36 which performs two functions. First, it deactivates the inhibit pulse generator 18 and inhibits circuit 20 from having any effect on the creation of timing pulses out of timing pulse generator 16. Secondly, and more importantly, the masking circuit 36 phase shifts the output from the phase adjustable frequency divider by 270 degrees and uses the resulting signal as a window for input data transitions.

Referring again to FIG. 3, line H represents the input data signal transition and line I represents a 270 degree phase shifted output from the phase adjustable frequency divider. The masking circuit 36 operates to prevent the timing pulse generator 16 from responding to any data transitions which occur outside of the windows determined by the masking circuit 36. That is, the timing pulse generator 16 can respond to an input data signal transition only during the time that the transition mask signal is at a logic 1 level. In this manner, noise signals which occur more than 90 degrees from an actual data transition do not result in an out of lock condition. As such, in the flywheel mode the system is extremely stable and precise in its lock to the encoded clock signal. Only upon the signal recovery logic 34 indicating that the system has fallen out of lock, by the absence of a produced lock signal, will the system revert to its prior described mode.

Concerning the duration of the masking signal, it should be understood that any masking signal time duration t, where $t \leq T/4$, will provide noise masking. Preferably, the masking signal is phased with respect to the input data transition such that t/2 of its period is on either side of the transitions of the pseudo clock signal. In this, the preferred embodiment of the invention, the masking signal is chosen to have a period of $t = T/4$.

Figure 2B:
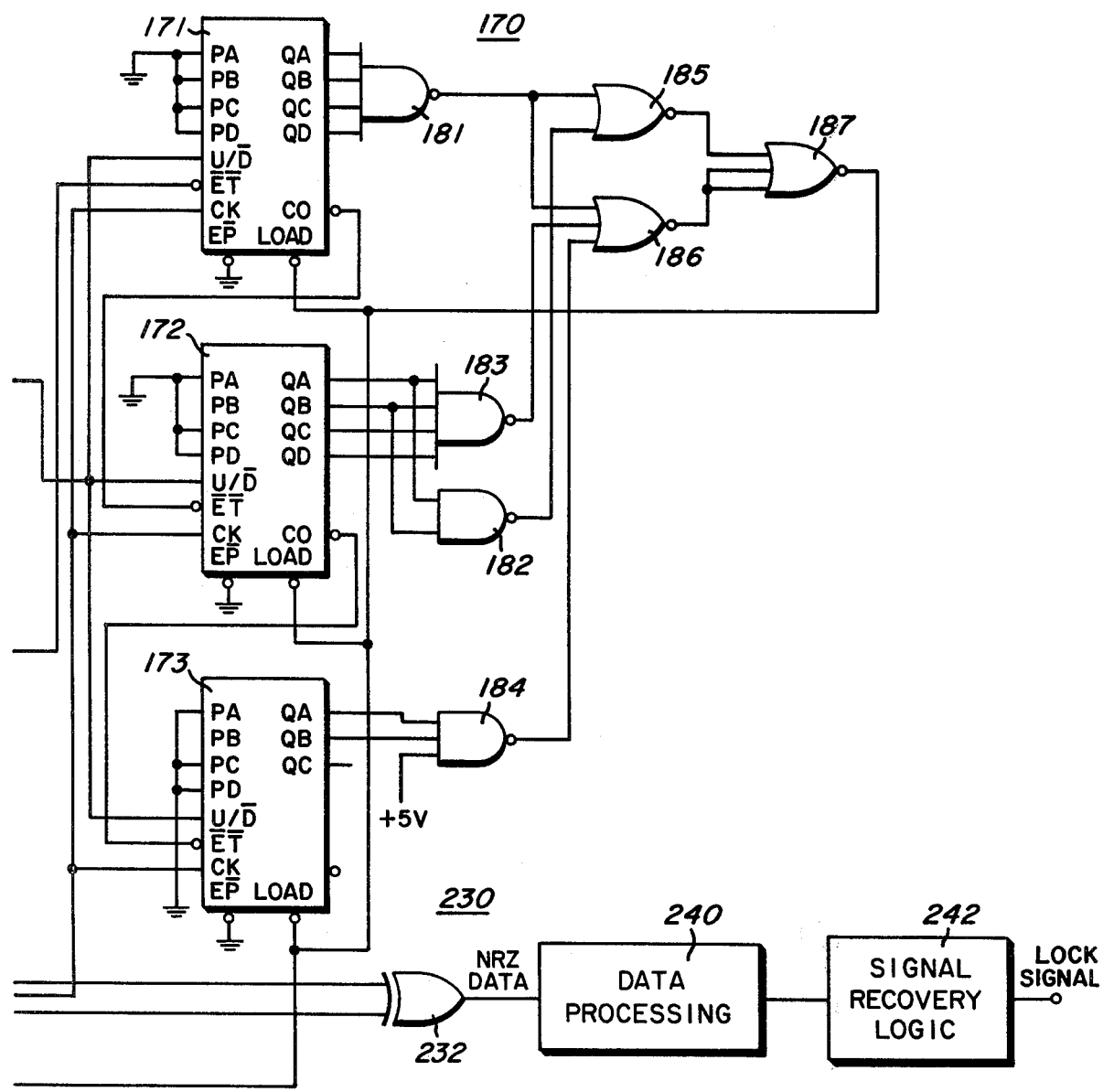

FIGS. 2A and 2B are detailed schematic diagrams showing the preferred realization of the FIG. 1 system. Here, the input data signal is coupled over a line 110 to zero crossing detector, indicated generally at 112. This signal is DC blocked and rebiased to one-half the supply voltage B+ (here +5 V) by the circuitry shown at 114 and is then amplified and limited by the amplifiers 116, 118.

The output from the zero crossing detector 112 is passed to the pseudo clock recovery circuit, indicated generally 120. Thus the wide band data is passed to the clock inputs of a pair of D FLIP-FLOPS 122, 124. As a result of an inversion provided by an inverter gate 126, the output of FLIP-FLOP 122 makes a transition in response to a positive input data transition, whereas FLIP-FLOP 124 is actuated on a negative data transition. Since the outputs of both FLIP-FLOPS 122 and 124 are coupled to NOR gate 128, the output of gate 128 goes low removing the clear signal on the eight bit counters 130 and 132. Also, NOR gate 134 initiates a positive going pulse which remains high until terminated by a high level at the remaining input to gate 134, i.e. a high appearing at the QD output of counter 132. Thus, the signal from gate 128 clears the counters 130, 132, and the counters act in cascade to begin counting up a 2.56 megahertz signal supplied by an external clock. The cascaded divisor ratio is such that the QD output from counter 132 remains low until 50 microseconds following clearing of the counters. Exactly 25 microseconds later (i.e. 75 microseconds from the initial data transition) the QC output of counter 132 goes high causing the output from NOR gate 140 to go low. This results in the output of inverter 142 going high and, thus, the output from gate 144 going low. With the output from gate 144 being coupled to the D input of FLIP-FLOP 146, this device produces an output transition exactly one clock pulse (195 nanoseconds) later causing the one FLIP-FLOP 122, 124 which was originally activated to be cleared. The output pulse from FLIP-FLOP 146 has a time duration of 390 nanoseconds.

If a noise transition on the input data signal occurs during the production of a pulse, thereby setting the opposite FLIP-FLOP, it too is cleared resetting the system for the next input data transition. The 195 nanosecond delay provided by FLIP-FLOP 146 removes any settling transients in the system caused by combining the data outputs from counter 132.

Thus, to summarize the operation of pseudo clock recovery circuit 120, in response to an input data transition either FLIP-FLOP 122 or 124 activates its output which causes cascaded counters 130, 132 to count-up a 2.56 megahertz clock signal. Exactly 50 microseconds after the initiation of the count-up, the QD output of counter 132 goes high which, when passed through NOR gate 134 with the clear signal, creates a 50 microsecond pulse (i.e. a pulse having a period T/2 where T is the period of the encoding clock signal). This 50 microsecond pulse appears on output line 150.

Exactly 25 microseconds after the 50 microsecond point, the output QC of counter 132 goes high whereby gates 140, 142 and 144 make a transition causing the D input of FLIP-FLOP 146 to be activated. Now, just one clock transition of the 2.56 megahertz clock later, the system is cleared and prepared for a subsequent data transition. During the 75 microseconds time from the beginning of the input data transition, the system is inhibited from responding to any subsequently received input data transition. Thus, in the manner described with respect to FIGS. 1 and 3, the pseudo clock recovery circuit 120 eventually locks in phase with the encoding clock signal.

The output from the pseudo clock recovery circuit 120 is passed to the phase comparator, here implemented by an exclusive OR gate 160. Exclusive OR gate 160 compares the pseudo clock recovery signal with the output from the phase adjustable frequency divider (discussed herein below) and produces a high output level for the duration of the time that the two input signals are at different logic levels. This resulting error signal is inverted through gate 162 and applied to the enable toggle input of the first 171 of three cascaded up/down counters 171–173, comprising a digital integrator 170. Applied to the clock input of each of the counters 171–173 is the aforementioned 2.56 megahertz clock signal. Thus, the longer the error signal, the greater the count achieved by the three counters.

FLIP-FLOP 176 compares the same two signals as phase comparator 160. Its output, through FLIP-FLOP 178, directs the up/down counter chain 171–173 in either their up or down count mode depending upon whether the phase adjustable frequency divider signal is leading or lagging the pseudo clock signal.

If FLIP-FLOP 178 were not in the circuit, up/down transitions very close to clock times could be acted upon by each counter differently depending upon their independent internal propagation delays.

The counters 171–173 are preset to one-half of their full count value. During the period of error signals produced by gate 160, the counters up or down count, as determined by FLIP-FLOP 176, at a rate determined by the 2.56 megahertz signal. Thus, the net count in the counters 171–173 from their preset value is indicative of phase error between the two signals.

If the counters reach zero count, either by counting down or by counting up and overflowing from their maximum count state, the combination of logic 181–187 detects this zero state and signals the phase adjustable frequency divider, in a manner discussed herein below, to adjust the phase of the 10 kilohertz output by 390 nanoseconds. The direction of the correction is set by the lead/lag FLIP-FLOP 176 and is held in memory by FLIP-FLOP 190. In addition, the output from gate 187 preloads all counters back to their original one-half full count state.

The output from the digital integrator 170 is passed to the phase adjustable frequency divider indicated generally at 200. In operation, this circuit deletes or adds single counts to its basic 2.56 megahertz input clock whenever the up/down counters overflow. These changes are then reflected as a +/−390 nanosecond phase adjustment in the ten kilohertz output.

In operation, whenever the up/down counters reach terminal count, the D FLIP-FLIP 202 causes the J and K inputs of JK FLIP-FLOP 204 to be driven low. With these inputs low, the FLIP-FLOP 204 ignores the next, but only the next transition of the 2.56 megahertz clock. If the lead-lag FLIP-FLOP 176 is low at terminal count, the output from NOR gate 206 goes high. This state is entered into bit memory 190. Thus, the output from memory 190 goes low for one clock period and a pulse is applied to the input of exclusive OR gate 210. The output from exclusive OR gate 210 drives a cascade of two counters 211, 212.

The pulse supplied by bit memory 190 has the effect of adding two counting edges at the input of the counter chain. Therefore, the circuit has in effect deleted one counting edge and added in two—a net addition of one. If the lead/lag FLIP-FLOP 176 has been high, gate 206 would have remained low with the output from bit memory 190 being high and the pulse would not have been added to the exclusive OR gate 210. In this mode, then, a net minus one count would have occurred in the counting chain 211, 212.

Thus, in accordance with the above discussion, individual pulses of the 2.56 megahertz clock may be either added to or deleted from the clock signal applied to the counting chain to phase advance or retard the ten kilohertz signal appearing at the output of counter 212.

Hence, in the manner described with respect to FIG. 1, the phase comparator 160 creates an error signal which, when integrated through digital integrator 170 and applied to the phase adjustable frequency divider 200, results in the output from the phase adjustable frequency divider to ultimately lock to the pseudo clock signal.

The input Manchester data and recovered clock signal are fed to the NRZ decoder, indicated generally at 230. This decoder is comprised of an exclusive OR gate 232, the resulting output from which is the NRZ data.

The NRZ data undergoes further data processing in data processing block 240. The exact details of this data processing are not described herein since they are not part of this invention. However, such data processing is common in this art and such processing techniques would be well known to anyone of ordinary skill.

The processed data is passed to a signal recovery logic block 242 which is capable of analyzing the input data and determining whether the data is being properly decoded. As is discussed herein above, this may be accomplished by recognizing a given sequence, such as the Barker code, in the input signal and when the code is suitably recovered indicating the state of clock lock. The precise details of the signal recovery logic block 242 will also not be described herein since it does not form a part of this invention. However, as with data processing block 240, the design and construction of signal recovery logic block 242 would be obvious to one of ordinary skill in this art.

As is discussed herein above, the lock signal is used to activate the pseudo clock recovery circuitry into a flywheel mode. Thus, referring again to the pseudo clock recovery circuitry 120, a lock signal will allow a phase shifted pulse to pass through gate 250 to the D inputs of FLIP-FLOPS 122 and 124. This phase shifted pulse is produced by a D FLIP-FLOP 252. Applied to the D input of FLIP-FLOP 252 is the ten kilohertz of the recovered clock signal as well as a twenty kilohertz signal out of counter 212, shown in lines H and G respectively of FIG. 3. Thus, the output of FLIP-FLOP 252 is the ten kilohertz phase locked signal delayed by 90 degrees. A delay by 90 degrees is the same as an advance of 270 degrees.

Thus, the 270 degree advanced clock signal acts as a "mask" signal at the D inputs of the FLIP-FLOP 122, 124. That is, as the inputs to these FLIP-FLOPS are low during the mask signal, they will not respond to input data transitions. The masking is such that it prevents the pseudo clock recovery circuit from responding to any transitions occurring ±90 degrees from a locked clock transition.

When in the flywheel mode, a locked signal turns off gate 140 and prevents a generation of the aforedescribed 75 microsecond inhibit pulse.

In summary, improved clock recovery circuitry has been described which is both high speed and precise in operation.

While a preferred embodiment of the invention has been described in detail, it should be apparent that many modifications and variations thereto are possible, all of which fall within the true spirit and scope of the invention.

I claim:

1. Apparatus for recovering the clock signal, of predetermined period T, within a predetermined phase shift keyed encoded input data signal comprising:
    pseudo clock signal means for producing a pseudo clock signal having a period T and having a transition corresponding to said input data signal;
    phase lock means including:
        oscillator means for producing a phase variable signal having said predetermined period T; and
        phase comparator means for comparing the phase of said oscillator means produced signal with the phase of said pseudo clock signal and causing the phase of said oscillator means produced signal to tend to lock with said pseudo clock signal;
    logic means for producing a lock signal responsive to said oscillator means produced signal being in phase lock with the clock signal of said encoded input data signal; and
    masking means being responsive to a produced lock signal for producing a masking signal having a predetermined time duration t, where $t \leq T/2$, with t/2 of said masking signal being on either side of the transitions of said pseudo clock signal, and masking circuitry for preventing said pseudo clock signal from responding to input data signal transitions which occur outside of said masking signal duration,
    whereby said oscillator means produced signal comprises said recovered clock signal.

2. The apparatus of claim 1 wherein said pseudo clock signal means comprises:
    timing pulse means for producing, synchronous to the occurrence of an input data transition, a timing pulse having a period T/2;
    inhibit pulse means for producing, synchronous to the occurrence of an input data transition, an inhibit pulse having a predetermined period $T_I$, where $T/2 < T_I < T$; and inhibit means for inhibiting the production of a timing pulse during said period $T_I$ of said inhibit pulse, whereby said timing pulses comprise said pseudo clock signal.

3. The apparatus of claim 2 wherein said inhibit pulse means produces said inhibit pulse with a period $T_I = 3T/4$.

4. The apparatus of any of claims 1, 2 or 3 wherein said phase shift keyed input data signal is Manchester encoded.

5. The apparatus of any of claims 1, 2 or 3 wherein said masking means produced masking signal has a period $t = T/4$.

6. The apparatus of claim 5 wherein said phase shift keyed input data signal is Manchester encoded.

7. The apparatus of claim 1 wherein said masking means includes means responding to the cessation of a lock signal to cease further input data transition masking.

8. Apparatus for producing a pseudo clock signal recreating the clock signal, of predetermined period T, within a predetermined phase shift keyed encoded input data signal comprising:

timing pulse means for producing, synchronous to the occurrence of an input data transition, a timing pulse having a period $T/2$;

inhibit pulse means for producing, synchronous to the occurrence of an input data transition, an inhibit pulse having a predetermined period $T_I$, where $T/2 < T_I < T$; and inhibit means for inhibiting the production of a timing pulse during said period $T_I$ of said inhibit pulse, whereby said timing pulses comprise said pseudo clock signal.

9. The apparatus of claim 8 wherein said inhibit pulse means produces said inhibit pulse having a period $T_I = 3T/4$.

10. The apparatus of either of claims 8 or 9 wherein said phase shift keyed input data signal is Manchester encoded.

* * * * *